United States Patent [19]

Fisher et al.

[11] 4,308,614
[45] Dec. 29, 1981

[54] NOISE-REDUCTION SAMPLING SYSTEM

[76] Inventors: Charles B. Fisher, 2850 Hill Park Rd., Montreal, H3H 1T1; Sidney T. Fisher, 53 Morrison Ave., Mt. Royal, H3R 1K3, Quebec, both of Canada

[21] Appl. No.: 955,153

[22] Filed: Oct. 26, 1978

[51] Int. Cl.³ ............................................. H04J 15/00
[52] U.S. Cl. ..................................... 370/119; 370/118
[58] Field of Search ....... 179/15 BC, 15 BW, 15 AN, 179/1 GS, 1 GB; 325/473, 477, 479, 480, 472; 340/347 M; 370/119, 118, 19; 455/295, 296

[56] References Cited

U.S. PATENT DOCUMENTS

| 3,204,034 | 8/1965 | Ballard et al. | 179/15 BC |
| 3,969,585 | 7/1976 | Boulanger | 179/15 FD |
| 4,075,427 | 2/1978 | Mattsson et al. | 179/15 BC |
| 4,105,977 | 8/1978 | Fitting et al. | 325/472 |

FOREIGN PATENT DOCUMENTS

| 1229593 | 12/1966 | Fed. Rep. of Germany | 179/15 BC |
| 2233614 | 3/1974 | Fed. Rep. of Germany | 179/15 BC |

OTHER PUBLICATIONS

*Information Transmission, Modulation, and Noise* by Schwartz, McGraw-Hill, pp. 125, 126, 1970.
R. Weiss, "Heart Sound Discriminator . . ." *Electronics* 34:24 p. 52, 1968.
Prigozy, "Zero-Crossing Detector . . ." *Electronics* Apr. 19, 1965 p. 91.
Ferrar, "Delayed Output Pulse Generator" *EEE* 13:10 p. 71, 1968.
H. S. Black, "Modulation Theory" New York 1953 p. 68 & 176 to 179.
"Comments on Notice of Proposed Rule Making", FCC released 10-19-78.

*Primary Examiner*—Douglas W. Olms

[57] ABSTRACT

This invention provides means and method of eliminating a selected wave from a frequency band containing a plurality of waves, by sampling the plurality of waves at a rate greater than the nyquist rate for the frequency band in herz, at instants at which the selected wave has zero amplitude, and integrating the sequence of samples so obtained to produce a replica of the plurality of waves less the selected wave.

The plurality of waves less the selected wave may be subtracted from the plurality of waves, after adjustment of relative amplitude and delay, so that the selected wave is obtained substantially free of other waves of the plurality of waves.

Thus a selected undesired wave, with a maximum period between successive instants of zero amplitude of less than the nyquist interval for the frequency band, may be substantially eliminated without affecting other waves; a selected desired wave, with a maximum period between successive instants of zero amplitude of one-half the period of the bandwidth of the frequency band, may be recovered substantially free from noise.

3 Claims, 3 Drawing Figures

NOISE-REDUCTION SAMPLING SYSTEM

BACKGROUND OF THE INVENTION

This invention relates to substantial elimination of a selected wave from a plurality of waves in a given frequency band by sampling and reconstruction techniques, and to the recovery of the selected wave substantially free from the other waves in the frequency band.

No prior patent, publication or apparatus known to us provides for substantially complete elimination of an unwanted wave without affecting other waves in the same frequency band, or discloses means or method of sampling a plurality of waves in a given frequency band at instants of zero amplitude of a selected wave, in order to substantially eliminate the selected wave, or to deliver the selected wave substantially free from other waves in the same frequency band.

BRIEF DESCRIPTION OF THE INVENTION

This invention discloses means and method for the substantial elimination of a selected wave from a plurality of waves in a frequency band, without materially affecting the other waves, by sampling the plurality of waves at instants of zero amplitude of the selected wave, at a rate greater than the Nyquist rate for the frequency band in herz, and reconstructing the plurality of waves less the selected wave by integrating the sequence of samples. The selected wave has a maximum period between successive instants of zero amplitude of less than the Nyquist interval for the frequency band. The selected wave may be a sine wave, a double-sideband amplitude-modulated wave with or without simultaneous angle modulation, or a sequence of pulses with zero amplitude between successive pulses.

This invention further discloses means and method for delivering the selected wave free from the other waves in the frequency band, by adjusting the amplitude and delay of the plurality of waves less the selected wave, relative to the plurality of waves including the selected wave, and after such adjustment subtracting the plurality of waves less the selected wave from the plurality of waves, giving as a result the selected wave substantially free from noise and interference due to the other waves in the frequency band. Another embodiment of the invention which improves signal-to-noise ratio is to sample the plurality of waves a second time at a rate greater than the Nyquist rate for the frequency band, at instants near peak values of the selected wave, and to reconstruct the plurality of waves including the selected wave by integration of the second sequence of samples thus produced. The second sampling rate may equal the first sampling rate. In another embodiment a single reversible gate and a single integrating means is used for both sequences of samples, and pulse generators open the gate with a sequence of pulses of one polarity at instants of zero-crossings of the selected wave, and open the gate with reversed poling with a sequence of pulses of opposite polarity at instants near peak values of the selected wave, both sequences of pulses having the same duration and repetition rate. In another embodiment the two sequences of samples are reconstructed by a filter having a bandwidth at least equal to the width of the frequency band and centered on an integral multiple of the sampling frequency other than the carrier frequency.

The operation of receiving apparatus according to this invention depends on sampling theory, which is given in simplified form in Transmission Systems for Communication, New York 1971, pages 116 to 118 and 125 to 128, inclusive, and in Reference Data for Radio Engineers, New York 1970, page 21-14, and more fully in the reference quoted therein. Sampling theory teaches that if a signal is sampled for short durations, at regular intervals which are less than about one-half the period of the frequency of the signal band, then the resultant sequence of samples contains all the information of the original signal. This interval is precisely defined for any frequency band and is known as the Nyquist interval for that band. Thus for a signal extending near or down to zero frequency the maximum sampling interval is less than one-half the period of the highest information-carrying signal frequency. For signals which do not extend to near zero frequency, the same rule applies for large ratios of highest signal frequency to signal bandwidth, but a reduced interval is required for the smaller ratios, for example with the highest information-carrying signal frequency 7 times the signal bandwidth the sampling interval must be less than about 0.4 times the period of the frequency of the signal bandwidth. The signal may be accurately reconstructed by integrating the sequence of signal samples in a filter which has the same passband as the signal frequency band, but does not pass the sampling frequency and other unwanted components. Thus a voice wave extending from 200 Hz to 3500 Hz may be sampled 8000 times per second at intervals of 125 microseconds, and may be accurately reconstructed, except for an amplitude factor and delay or phase shift due to the filter, in a low-pass filter with a cut-off between 3500 and 8000 Hz. A band of noise extending from 496.5 kHz to 503.5 kHz, for a further example, may be sampled 16,000 times per second at intervals of 62.5 microseconds, and may be accurately reconstructed, except for an amplitude factor and delay or phase shift due to the filter, in a band-pass filter with a passband from about 496 to 504 kHz.

DETAILED DESCRIPTION OF THE INVENTION

Figure 1:
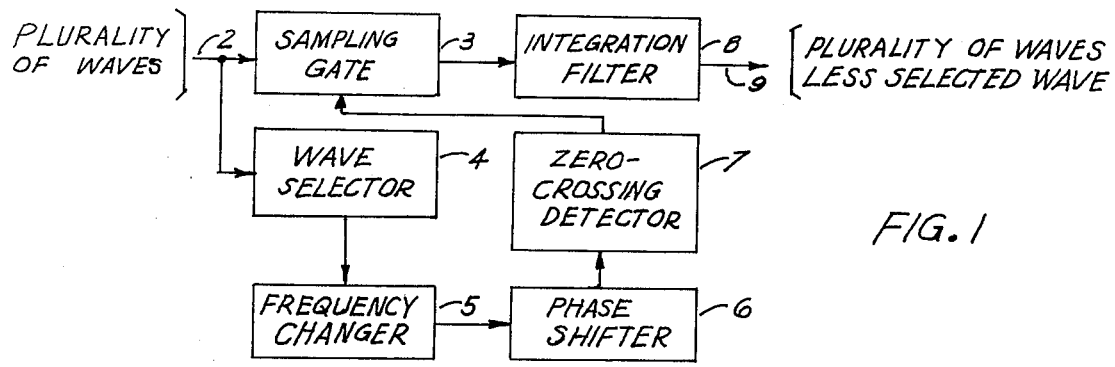
FIG. 1 shows a block schematic of a receiving apparatus according to the invention which eliminates an undesired selected wave from a plurality of waves.

FIG. 1 shows a block schematic of a receiving apparatus according to the invention which eliminates an undesired selected wave from a plurality of waves, the selected wave occupying part or all of the frequency band of the plurality of waves.

The plurality of waves including the undesired selected wave appears on input lead 2 and is carried to gate 3 and undesired wave selector 4. The undesired selected wave may be a sine wave without modulation, a carrier with double-sideband amplitude modulation, angle modulation or both types of modulation, or a sequence of data pulses. Selective and limiting means in selector 4 remove substantially all modulation and components of other waves of the plurality of waves from the carrier of the selected wave. Such a device is well known in the prior art. This carrier is then delivered to frequency changer 5 which changes the carrier frequency to a new frequency greater than and approximately equal to the frequency band of the plurality of waves.

Phase-locked frequency changers performing this functions are known in the prior art. The frequency-changed carrier from changer 5 is delivered to phase shifter 6, which shifts the phase of the frequency-changed carrier so that its frequency crossings occur at instants of frequency crossings of the corresponding wave on lead 2. The output of phase shifter 6 passes to zero-crossing detector 7, a device known in the prior art, for example, Prigozy, "Zero-crossing detector provides fast sync pulses" in Electronics, Apr. 19, 1965, page 91. Detector 7 delivers two short pulses to gate 3 for each cycle of the frequency-changed carrier, at instants at which the selected wave has zero amplitude on lead 2 at the input to gate 3. Thus the output of gate 3 consists of a sequence of samples of the plurality of waves, not including the undesired selected wave, at a rate higher than Nyguist rate for the frequency band of the plurality of waves and is delivered to integrating filter 8.

When the frequency band of the plurality of wave does not extend near zero frequency, filter 8 is a band-pass filter with a pass-band adequate to pass the plurality of waves, but stopping the sampling frequency and other extraneous components. In this case also the output of filter 8 does not include the selected wave but no other wave or component of the plurality of waves has been affected unduly in phase or relative amplitude by the functioning of gate 3 or filter 8, except when such component has the same frequency as the carrier of the selected wave or is one of a pair of components which lie at equal frequency spacing on each side of the selected wave carrier, and are simultaneously in phase with each other and the carrier at regularly spaced instants.

Figure 2:
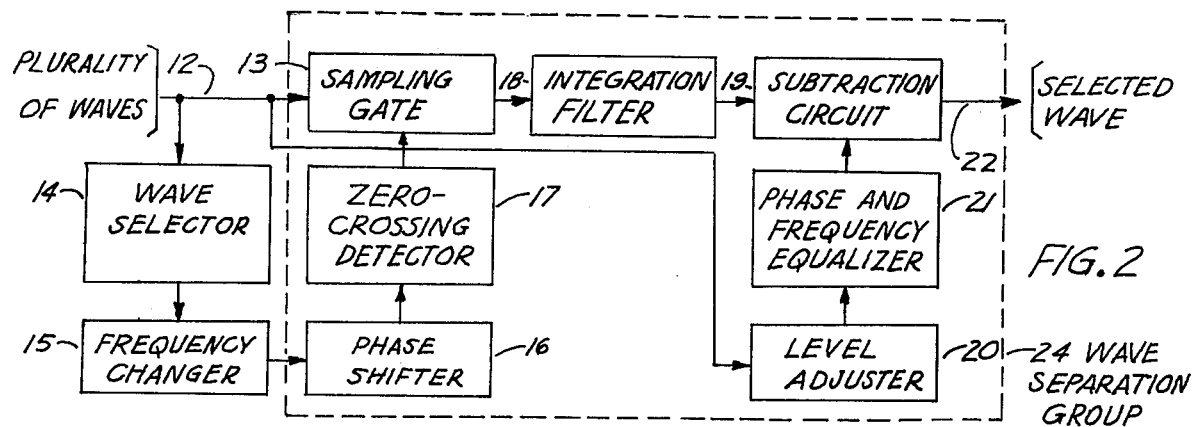
FIG. 2 shows a block schematic of a receiving apparatus according to the invention which separates a desired selected wave from a plurality of waves in the same frequency band by a single sampling and subtraction process.

FIG. 2 shows a block schematic diagram of receiving apparatus according to this invention which produces a desired selected wave, substantially free of other waves or their components, from a plurality of waves lying in a frequency band which may be partly or wholly occupied by the selected wave, without affecting the relative phase or amplitude of the other waves of the plurality or their components.

A plurality of waves including the desired selected wave, occupying a given frequency band, is received on input lead 12 and passes on to gate 13, desired wave selector 14 and level adjuster 20. Desired wave selector 14 uses selective and limiting means to derive a carrier of the selected wave from the plurality of waves, substantially free from modulation and other waves of the plurality of waves and their components. This is a well known device of the prior art. The carrier of the selected wave is delivered to frequency changer 15, a device of the prior art, which has an output with a minimum frequency equal to the frequency band of the plurality of waves, and phase-locked to the selected carrier, so that zero crossings of the frequency changed carrier occur at zero crossings of the output of selector 14. The frequency changed carrier is delivered to phase shifter 16, at whose output the zero crossings of the changed carrier occur at instants of zero crossings of the corresponding wave at lead 12. The output of phase shifter 16 is delivered to zero-crossing detector 17, known to the prior art, which produces a short pulse at each zero crossing of the changed carrier, and these pulses open gate 13 to permit a sequence of short samples, taken at instants of zero crossings of the selected wave, to pass to integration filter 18. These pulses fully define the plurality of waves less the selected wave, and are integrated by filter 18 and passed on to one input of subtraction circuit 19. This may be a 3-winding transformer with two oppositely-poled input windings and one output winding. The plurality of waves from lead 12 passes through level adjuster 20 and phase and frequency equalizer 21 to the second input of subtraction circuit 19. Constants and poling of adjuster 20, equalizer 21 and circuit 19 are selected so that the plurality of waves less the selected wave at the first input of circuit 19 is subtracted from the plurality of waves including the selected wave at the second input of circuit 19, with the result that the output of circuit 19 which is delivered over output lead 22 consists of the desired selected wave substantially free from waves or components of waves of the plurality of waves. The elements which cause the selection of the desired wave from the selected wave are gate 13, filter 18, phase shifter 16, zero-crossing detector 17, level adjuster 20, equalizer 21 and subtraction circuit 19. These elements together are designated wave separation group 24.

Figure 3:
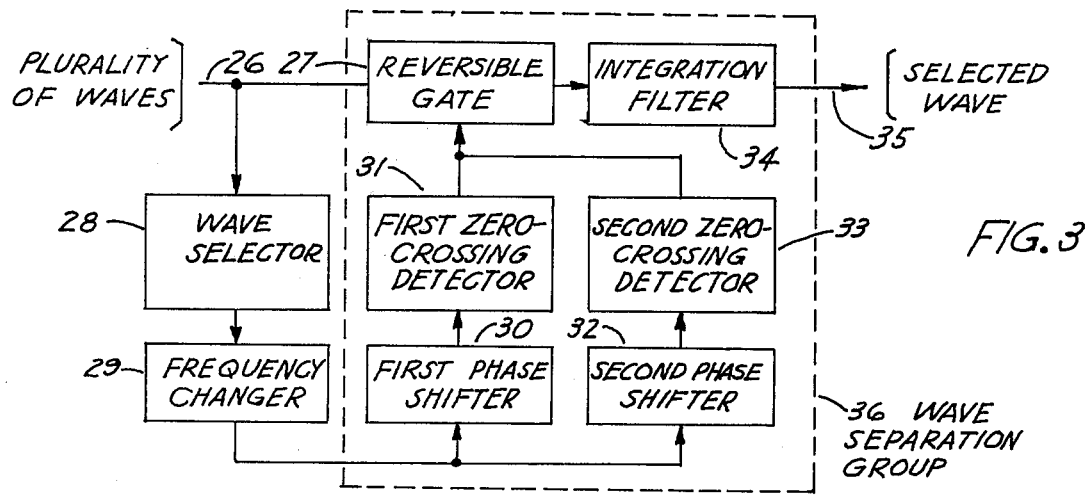
FIG. 3 shows a block schematic of a receiving apparatus according to the invention which separates a desired selected wave from a plurality of waves in the same frequency band by sampling the plurality of waves twice at different phases of the selected wave, and with opposed polarities.

FIG. 3 shows a schematic block diagram of receiving apparatus according to this invention which produces a desired selected wave occupying part or all of the frequency band of a plurality of waves, by sampling the plurality of waves twice at different phases of the carrier of the selected wave, and subtracting one of the sequences so produced from the other and integrating the resultant, to obtain the desired wave free from, and without affecting, the other waves and their components.

In FIG. 3 a plurality of waves including a desired selected wave, which may occupy part or all of the frequency band of the plurality of waves, is taken by input lead 26 to reversible gate 27 and desired wave selector 28. Selector 28 by selective and limiting means, known to the prior art, substantially frees the carrier of the selected wave from modulation and components of the other waves, and delivers it as a sine wave to frequency changer 29, a known device, which changes the frequency of the selected carrier so that it is approximately equal to but greater than the frequency of the frequency band of the input plurality of waves, and delivers the changed carrier to first phase shifter 30. This shifts the phase of the changed carrier so that its zero crossings occur at instants of zero crossings of the desired wave at lead 26. The shifted changed carrier is delivered to first zero-crossing detector 31, a device known to the prior art, which delivers short pulses of a first polarity to reversible gate 27, which cause gate 27 to pass a sequence of short samples of the plurality of waves, at instants of zero crossings of the desired selected wave, to integration filter 34. Frequency changer 29 also delivers the changed selected carrier to second phase shifter 32, which shifts the selected carrier phase so that its output has zero crossings at approximate instants of peaks of the desired selected wave at lead 26.

The output of second phase shifter 32 is delivered to second zero-crossing detector 33, which delivers short pulses of the same amplitude and duration, and opposite in polarity to the pulses from first zero crossing detector 31, at approximate instants of peaks of the desired selected wave on lead 26, to reversible gate 27. Gate 27 is a device known to the prior art which delivers an output wave in phase with the input wave when the gate is opened by a pulse of one polarity, and delivers and output wave 180° out of phase with the input wave when the gate is opened by a pulse of the opposite polarity. Thus gate 27 operates as a straight-through connection when receiving pulses from first zero-crossing detector 31 at instants of zero-crossings of the desired selected wave, and operates as a reversed connection when receiving pulses from second zero-crossing detector 33 at instants of peaks of the desired selected wave. Thus the output of gate 27 consists of two sequences of samples. The first sequence consists of samples of the plurality of waves taken at instances of zero crossings of the desired selected wave, and hence does not include that wave but fully defines the other waves of the plurality of waves. The second sequence consists of samples, with reversed poling, taken at approximate instants of peaks of the desired selected wave, and hence includes that wave and fully defines the plurality of waves. Since these two sequences are oppositely poled, they are both integrated and one is subtracted from the other in integration filter 34. This filter passes the frequency band of the plurality of waves, but stops the sampling frequency and other extraneous frequencies. As a result, the desired selected wave, substantially free from other waves or components, appears on output lead 35.

In this invention as embodied in FIGS. 1, 2 and 3 the received wave consists of a plurality of waves in a frequency band, one of the plurality of waves being designated a selected wave and a carrier derived from it. A selected wave may take several forms. If it carries no information it may consist of a constant-frequency constant-amplitude unmodulated sine wave, or such a sine wave modulated in amplitude by a constant repetitive waveform on a double-sideband basis. If the selected wave carries information it may consist of a sine wave modulated in amplitude by a message on a double-sideband basis. The selected wave carrying information may also consist of a sequence of pulses at regular intervals, with zero amplitude between successive pulses and some pulses omitted, as in a typical digital signal.

All selected waves of the types mentioned, when subjected to selectivity and amplitude limitation, yield a single sine wave of substantially constant amplitude, phase and frequency, or with a frequency varying at a rate which can be passed by the selective circuits and followed by the frequency changers and zero-crossing detectors of our invention. We have therefore throughout this disclosure designated the single sine wave just described as a carrier, although this departs somewhat from conventional usage of the word.

We have described in this specification means of substantially separating a selected wave which occupies at least a part of a frequency band from a plurality of waves occupying the frequency band. We have also described means for subtracting the plurality of waves less the selected wave from the plurality of waves, to produce the selected wave substantially free from the other waves of the plurality of waves and their components. The description of the invention, and of the manner and method of making and using it, has been given in such full, clear, concise and exact terms as to enable any person skilled in the art of receiving apparatus and multiplexers, and in sampling and modulation theory, to make and use the invention. We consider the best modes for carrying out our invention to be those described and shown in FIG. 2.

We claim:

1. Receiving apparatus for separating a selected periodic wave from a plurality of waves occupying a frequency band which has a Nyquist frequency less than the frequency of zero crossings of said selected periodic wave, without band-stop filter means in the transmission path of said plurality of waves, which comprises:
   selection means which selects the carrier of said selected periodic wave and substantially eliminates other waves, and
   frequency changing, phase shifting and pulse generating means which generates a sequence of gating pulses from said carrier occurring at instants of zero crossings of said selected periodic wave at a frequency greater than the Nyquist frequency of said frequency band, and
   gating means which receives said plurality of waves and is opened by said gating pulses to produce a sequence samples of said plurality of waves less said selected periodic wave, and
   filter means which receives said sequence of samples, reconstructs from them said plurality of waves less said selected periodic wave, passes said frequency band and attenuates frequencies outside said frequency band.

2. Receiving apparatus according to claim 1 which comprises:
   selection means, including selectivity and amplitude limiting means, which receives said plurality of waves and selects the carrier of said selected periodic wave substantially free from sidebands and said other waves from said plurality of waves, and
   frequency changing means which receives said carrier of said selected periodic wave from said selection means and changes the frequency of said carrier to a changed frequency, and
   phase shifting means which shifts the phase of said changed frequency carrier, and
   pulse generating means, which may be zero-crossing detection means, receives and uses said phase shifted carrier to generate a sequence of gating pulses occurring at instants of zero crossings of said selected periodic wave at a frequency greater than the Nyquist frequency of said frequency band, and
   gating means which receives said plurality of waves, is opened by said sequence of gating pulses and delivers a sequence of samples of said plurality of waves less said selected periodic wave, and
   filter means which receives said sequence of samples, reconstructs from them said plurality of waves less said selected periodic wave, passes said frequency band and attenuates frequencies outside said frequency band.

3. Receiving apparatus which comprises means to separate a selected periodic wave from a plurality of waves in accordance with claim 1, means to adjust the relative level, phase and amplitude versus frequency of said plurality of waves relative to said plurality of waves less said selected periodic wave, and means to subtract said adjusted plurality of waves from said plurality of waves less said selected periodic wave.

* * * * *